United States Patent [19]

Norder et al.

[11] 4,442,854
[45] Apr. 17, 1984

[54] ELECTRO-PNEUMATIC SIGNAL CONVERTER

[75] Inventors: Stig Norder; Lars-Erik Nilsson, both of Säffle, Sweden

[73] Assignee: Aktiebolag Somas Ventiler, Saffle, Sweden

[21] Appl. No.: 341,018

[22] Filed: Jan. 20, 1982

[30] Foreign Application Priority Data

Feb. 9, 1981 [SE] Sweden .............................. 8100874

[51] Int. Cl.³ .................... F16K 31/02; G05D 16/00
[52] U.S. Cl. ...................................... 137/82; 251/129
[58] Field of Search ................... 137/82, 85; 251/141, 251/139; 335/219, 220

[56] References Cited

U.S. PATENT DOCUMENTS

| | | | |
|---|---|---|---|
| 3,174,499 | 3/1905 | Mott | 137/82 |
| 3,586,287 | 6/1971 | Knobel | 251/141 X |
| 3,645,293 | 2/1972 | Pedersen | 137/82 UX |
| 3,982,554 | 9/1976 | Saito | 137/82 |

Primary Examiner—Alan Cohan
Attorney, Agent, or Firm—Murray and Whisenhunt

[57] ABSTRACT

An electro-pneumatic signal converter for converting an electrical current signal into a pneumatic pressure, comprising a force balancing system where a magnetic force is balanced against a pneumatic force, consists of a coil (11) through which the electrical signal current flows, a magnetic circuit comprising a core (12) of ferromagnetic material disposed in the coil (11) with a nozzle chamber (14) with a mouth in the form of a nozzle (13) in one end of the core, a flapper (17) of ferromagnetic material over the nozzle and a link (16) of ferromagnetic material which closes the magnetic circuit between the flapper and the opposite end of the core, a feed line (19, 19A, 19B) for a constant flow of feed air into the nozzle chamber (14) and out again through the nozzle (13) into the gap (25) between the nozzle and the flapper, and a pressure-sensing line (24) from the nozzle chamber to a pressure-dependent member (7) to transmit a pneumatic pressure signal from the nozzle chamber to the pressure-dependent member.

5 Claims, 8 Drawing Figures

ELECTRO-PNEUMATIC SIGNAL CONVERTER

TECHNICAL FIELD

The invention relates to an electro-pneumatic signal converter for converting an electric current signal into a pneumatic pressure signal, comprising a force-balancing system in which a magnetic force is balanced against a pneumatic force.

BACKGROUND OF THE INVENTION

Signal converters of the kind indicated above are known where the current which is to be converted flows through a coil suspended in a magnetic field caused by a permanent magnet. The forces developed by the current and the magnetic field tend to push the coil out of the magnetic field. The force is compared, by a balance beam which is movable in a spring band cross, with the force which is developed in a bellows connected to the balance beam. If these forces are not alike, the position of the beam is altered. The new position is converted in a nozzle into a pneumatic pressure which acts on an upper diaphragm in a pneumatic amplifier belonging to the device. The device also includes a number of further components and functions which will not be described in more detail here.

This known device affords satisfactory linearity but also has certain decided disadvantages and limitations. Thus the high degree of complication of the device means that it is expensive which limits its field of application for economic reasons. The multiplicity of components also makes the device very demanding in space. This makes it difficult or impossible to use it in a limited space, as, for example, in connection with compact computerized centres. The number of movable components, particularly the comparatively long balance beam, also make it difficult to balance out which reduces the speed of reaction, that is to say the capacity to alter the pneumatic pressure signals quickly after alterations in the current signals. This is, in fact, a factor which is acquiring increasing importance in certain branches of industry, for example in the petrochemical industry (PE manufacture) and the paper industry (machine speeds up to 1200 m/min). The number of mechanical components in conventional systems also leads to friction which produces a delayed action which is expressed in the same manner as magnetic hysteresis, which limits the possibilities of achieving the best transfer characteristics. In addition, conventional systems are very sensitive to vibration which in many industrial connections is a very serious, not to say decisive disadvantage.

A further limitation of conventional electro-pneumatic signal converters is that they cannot use a working pressure of 4–6 bar, which is the prevalent working pressure in industry, without converters.

DISCLOSURE OF THE INVENTION

The object of the invention is to eliminate the above-mentioned limitations and disadvantages in conventional electro-pneumatic converters. More specifically, it is an object to offer a converter with very few movable parts, small space requirements, extremely satisfactory tolerance of vibration, satisfactory possibilities for balancing out and, inter alia, very high speed of reaction, and with satisfactory possibilities for achieving the optimum between hysteresis and transfer characteristics.

These and other objects can be achieved as a result of the fact that the signal converter comprises, in combination, a coil through which the electrical signal current flows; a magnetic circuit comprising a core of ferromagnetic material disposed in the coil with a nozzle chamber with a mouth in the form of a nozzle at one end of the core, a flapper of ferromagnetic material over the nozzle and a link of ferromagnetic material which closes the magnetic circuit between the flapper and the opposite end of the core; a feed line for a constant flow of feed air into the nozzle chamber and out again through the nozzle; and a pressure-sensing line from the nozzle chamber to a pressure-dependent member to supply a pneumatic pressure signal from the nozzle chamber to the pressure-dependent member.

Operation of the signal converter is very simple. The feed air is conveyed into the nozzle chamber from a pressure source at a constant speed. The pressure source may consist, for example, of a driving air source at 4 to 6 bar of the kind which is normal in industry. In order to obtain a constant flow of air, a throttle is provided in the entry passage so that the air flows into the nozzle chamber at sonic speed. From the nozzle chamber, the air flows out again through the nozzle into the gap between the mouth of the nozzle and the flapper. In the course of this, the air acts with an upwardly directed force on the flapper. At the same time, the current signal which is flowing through the coil generates a magnetic field in the core which acts through a downward force on the flapper. As a result of the current strength in the signal, the flapper therefore comes to assume different positions so that the pneumatic and magnetic forces which are acting on the flapper balance one another. Depending on the position of the flapper, the size of the air gap between the nozzle and the flap varies which in turn acts on the pressure in the nozzle and in the nozzle chamber. The pressure and the variations in pressure are supplied via a pressure sensing line to the pressure-sensing member which the aim is to influence. In order that the device may work in a satisfactory manner, it is important that the flapper should not move so quickly that the nozzle is closed before the air pressure has succeeded in balancing the magnetic force generated. It is therefore advisable to provide a member to damp the movement of the flapper. According to a preferred form of embodiment the damper consists of a body of electrically conducting, non-ferromagnetic material which surrounds the ferro-magnetic core in the region before the end which is adjacent to the flapper, which body acts as a short-circuit turn in which a current is induced caused by alterations in the current in the coil which generates a magnetic field in the core which is oppositely directed to the field generated in the coil by the current and which has a damping effect on the movements of the flapper.

Since the air gap between the flapper and the nozzle is very small, every alteration in the size of the air gap has a very powerful effect on the air pressure while the magnetic field, on the other hand, is influenced comparatively little. In order to avoid oscillation it is therefore advisable to limit the movement of the flapper towards the nozzle by providing a spacing member between the ferromagnetic material of the flapper and the ferromagnetic core. This is preferably effected as a result of the fact that the flapper is provided at its under side, that is to say at the side which is adjacent to the nozzle, with a coating or plate of non-ferromagnetic, preferably dielectric material, which prevents short-circuiting of the magnetic circuit between the core and the flapper. This plate or coating may appropriately be given a thickness between 0.1 and 0.5 mm, the thickness being selected depending on the other dimensions of the signal converter.

Further objects together with characteristics of the invention will be apparent from the following description of a preferred form of embodiment and the following patent claims.

BRIEF DESCRIPTION OF DRAWINGS

In the following description of a preferred form of embodiment, reference is made to the accompanying figures of the drawing in which.

DETAILED DESCRIPTION OF THE INVENTION

Figure 1A:
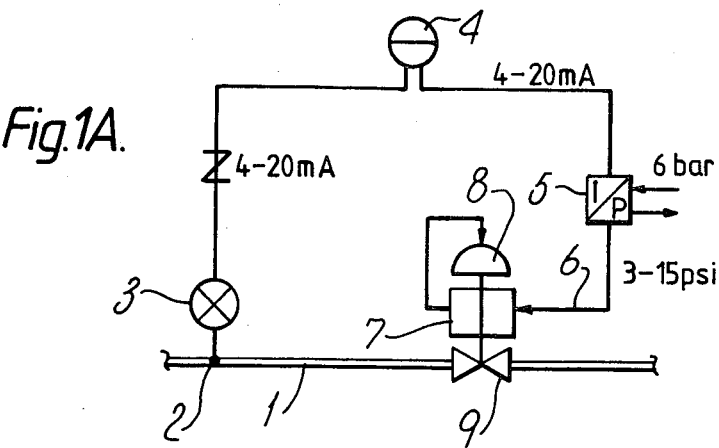
FIGS. 1A–C show three conceivable ways of disposing a signal converter in a regulating system.

The control equipment shown diagrammatically in FIG. 1A is adapted to regulate the flow in a pipeline 1. The flow in the pipe 1 is measured at a measuring point 2 and generates a pressure signal which is converted into a current signal in a pressure-current converter, a so-called pressure transmitter 3.

Figure 1B:
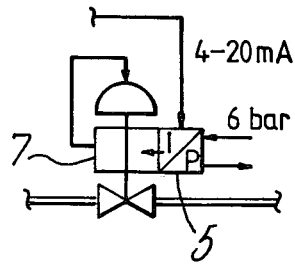
Figure 1C:
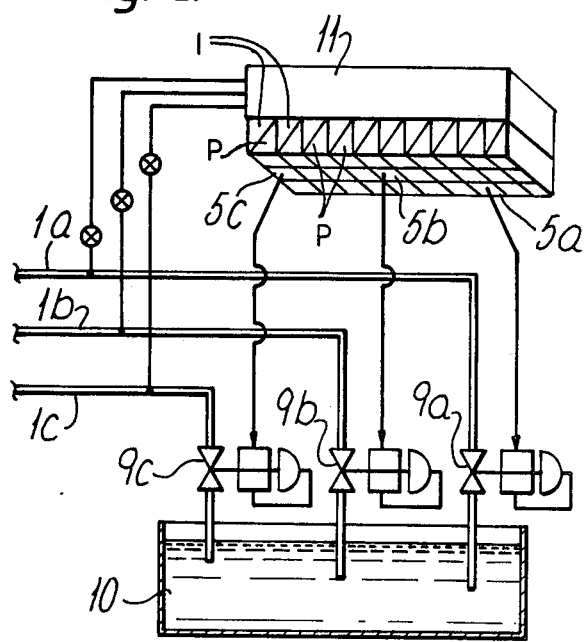

The actual value from the pressure transmitter 3 is treated in a regulator 4 with setting of the guide value. The regulator 4 delivers a setting value in the form of a signal current of 4–20 mA to a electro-pneumatic, so-called IP converter 5. The IP converter 5 is fed with driving air from a standard pressure source of 6 bar. At the output side of the IP converter a pneumatic pressure signal is obtained which is supplied, via a pressure line 6, to a so-called positioner 7 which controls a setting device 8 for setting the flap in a flap valve 9 in the pipeline 1 so that the desired flow is obtained in the pipe. FIG. 1A illustrates an arrangement which is very common in conventional installations, where the IP converter has to be placed at a distance from the positioner in view of the space requirements of the converter but often also because of the sensitivity of conventional IP converters to vibration. The IP converter according to the invention can also be disposed in the manner shown in FIG. 1A. The invention, however, provides great possibilities for placing the IP converter directly on the positioner 7, as illustrated in FIG. 1B, since the converter requires very little space and at the same time is extremely tolerant of vibrations. The small space requirements also make it possible, in practice, to dispose a large number of IP converters in a centre connected to a computer for controlling a large industrial plant. FIG. 1C illustrates this case. In the example, a portion of a large installation is shown, where the pipes 1A, 1B and 1C can be assumed to constitute pipes for dyes which are to be mixed in a dyeing bath 10. The three IP converters 5A, 5B and 5C which are included in a large battery of converters connected to a computer 11, are coupled to the respective positioners to regulate the flow in the pipes 1A–1B by controlling the respective flap valves 9A–C.

Figure 2:
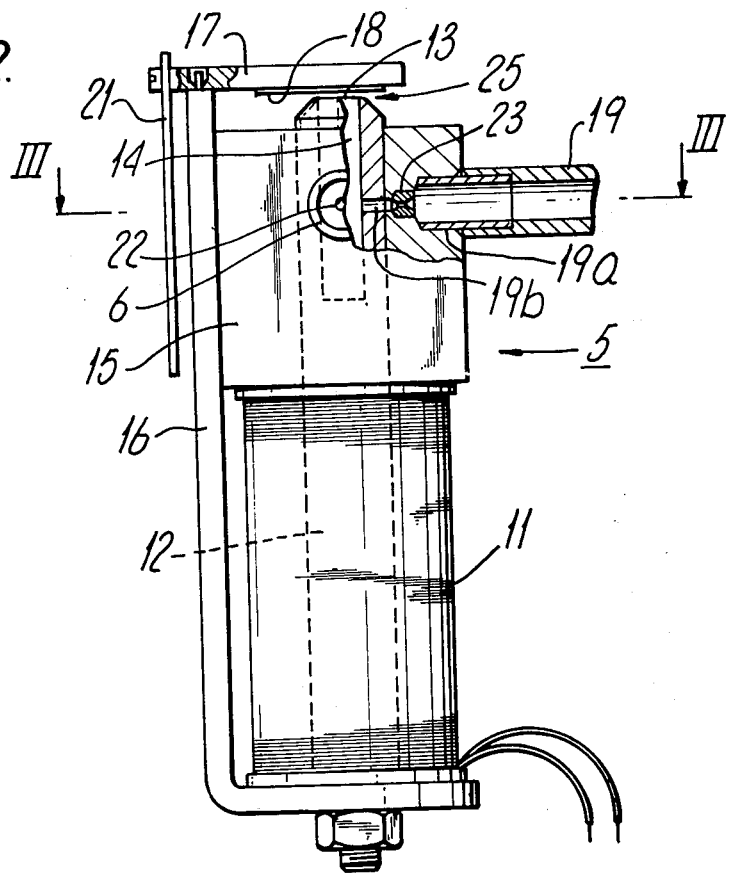
FIG. 2 constitutes a side view of the signal converter according to a preferred form of embodiment of the invention, FIG. 3 constitutes a section III—III of the signal converter according to the invention, FIG. 4 constitutes a block diagram of the converter according to the invention.
Figure 3:
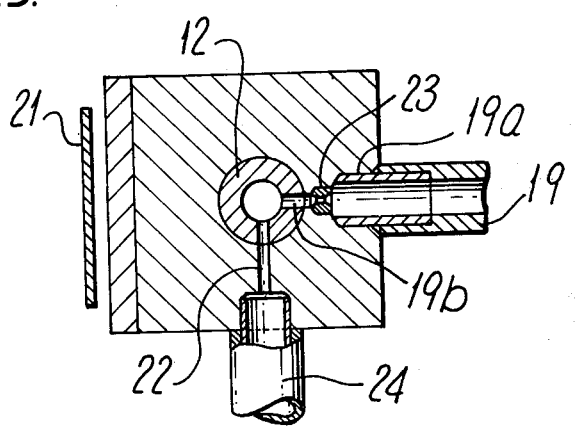
Figure 4:
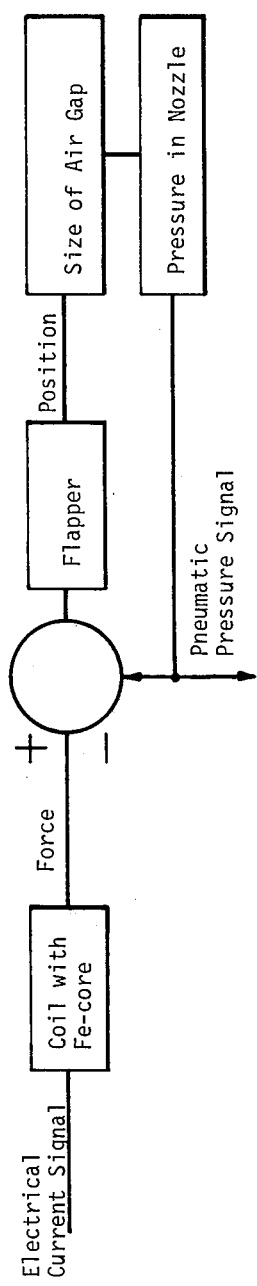

The construction of the electro-pneumatic converter 5—the IP converter—is shown in FIGS. 2 and 3. The arrangement comprises a coil 11 on a core 12 of ferromagnetic material. The core 12 extends past the upper end of the coil 11 and becomes narrower in its uppermost portion where a nozzle 13 with a nozzle chamber 14 is disposed, FIG. 3. In this case, a nozzle is understood to mean the mouth of the nozzle chamber. Between the coil 11 and the nozzle 13, the core 12 is surrounded by a body 15 of electrically conducting but non-ferromagnetic material, for example brass, copper, aluminium or the like metal. According to the form of embodiment, the metal body 15 has a square horizontal section and is firmly screwed to a bracket 16 of ferromagnetic material of the same kind as the core 12.

Disposed above the nozzle 13 is a flapper 17 which is also made of the same ferromagnetic material as the bracket 16 and the core 12. The flapper 17 is articulately mounted on the upper end of the bracket 16 and comprises a balance 21. Together, the core 12, the bracket 16 and the flapper 17 form a magnetic circuit for the magnetic field which is generated by the current in the coil 11. In order that the flow may be generated, a current signal must flow through the coil 11. In order to prevent the magnetic circuit from being short-circuited, there is a spacing member in the form of a thin washer 18 of plastics or the like at the under side of the flapper 17. The washer 18 has a thickness of 0.25 mm according to the form of embodiment.

Connected to the chamber 14 is a feed pipe 19 for driving air. According to the form of embodiment, the driving air is introduced through the metal body 15, that is to say in the radial direction towards the chamber 14. In itself, however, it is also possible to introduce the driving air axially through the core 12 from the lower end, in which case the core 12 may be produced, for example, from a length of tubing. With reference to FIG. 2, the infeed conduit through the metal body 15 is designated by the numeral 19a and its continuation in the wall of the core 12 by the numeral 19b. Disposed in the feed conduit 19a in the metal body 15 is a throttle 23 in the form of drilled-out ruby, so that the air which passes through the conduit 19b into the chamber flows into the chamber 14 at sonic speed, which guarantees a constant flow of air.

From the chamber 14, a pressure sensing passage 22 leads via a pressure sensing pipe 6 to the pressure-dependent member, for example a positioner, which is to be acted upon by the variations in pressure in the nozzle chamber 14. The gap between the nozzle 13 and the washer 18 at the under side of the flapper is designated by 25.

Figure 5:
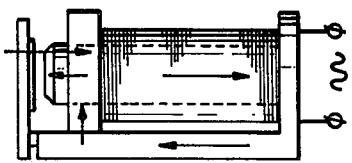
FIG. 5 shows diagrammatically the magnetic circuit in the converter according to the invention.

The device thus described works in the following manner. A current signal through the coil 11 generates a magnetic field in the core 12. The magnetic field tends to pull the flapper 17 in the downward direction. As a result of the fact that the flapper alters its position and so the air gap 25 is reduced, the air pressure is altered in the nozzle 13 and hence in the nozzle chamber 14. The pressure in the nozzle thus influences the flapper in the upward direction so that the downwardly directed magnetic force and the upwardly directed pneumatic pressure force balance one another. Variations in pressure in the nozzle chamber 14 are detected by the pressure sensing passage 22 leading into the nozzle chamber and are transmitted via the pressure line 24 to the pressure-dependent member. The reaction speed of the device is very high. In order to prevent the flapper 17 from moving down so quickly that the nozzle 13 is completely closed before the air pressure in the nozzle has succeeded in balancing the magnetic force, the metal body 15 is provided. Currents are actually induced in the metal body 15 which generate an oppositely directed magnetic field in the core 12 when the current signal in the coil 11 is altered. FIG. 5 illustrates the magnetic circuit, the longer arrows symbolizing the magnetic field which is generated by the coil 11, while the shorter arrows illustrate the oppositely directed field which is generated by the current which is induced in the metal body 15 as a result of alterations in the signal current. In combination with the spacer washer, the metal body 15 affords a suitable damping in the system, and the washer 18 prevents the thickness of the gap 25 from approaching zero. Thus, through the washer 18, the flapper 17 is prevented from oscillating when the flapper is in its lowest position, where every alteration couses very great alterations in the air pressure whereas the magnetic flux is influenced comparatively little.

Figure 6:
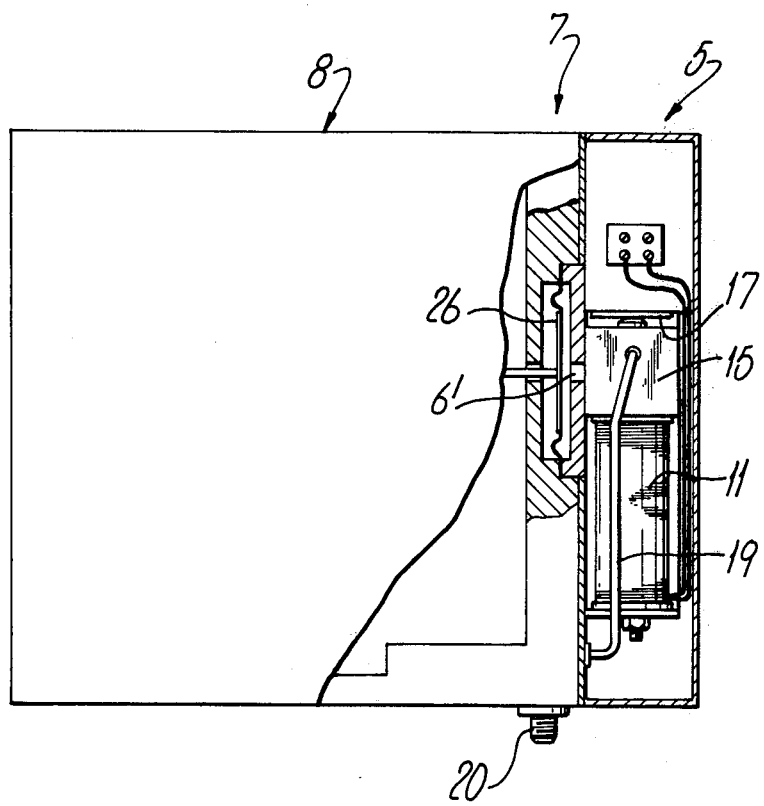
FIG. 6 illustrates how a signal converter according to the invention can be connected directly to a so-called positioner in a pneumatic setting device.

FIG. 6 illustrates how an IP converter 5 according to the invention, as a result of its handy format and vibration-tolerant formation, can be advantageously connected directly to a positioner 7 and a setting device 8 so that from these elements, an integrated unit 21 is obtained with small external dimensions. For the IP converter 5, the same designations have been used for corresponding parts as in FIG. 2. The unit 21 is fed with driving air to a common connection 20 from where driving air is obtained on the one hand for the setting device 8 and on the other hand for the IP converter 5. From the IP converter, a pressure signal is obtained which is transmitted via the directly coupled pressure-signal connection 6 to the pressure-sensitive diaphragm 26 of the positioner 7 so as to influence the setting device 8 in the desired manner in a known manner in the following parts.

We claim:

1. An electro-pneumatic signal converter for converting an electrical current signal into a pneumatic pressure, said converter comprising:
    a coil through which an electrical current signal flows, said coil generating a coil magnetic field when said electrical current signal flows through said coil;
    a magnetic circuit including a core of ferromagnetic material disposed in said coil, said core having a first end and a second end;
    a nozzle chamber in said core having a mouth in the form of a nozzle in said first end of said core;
    a flapper of ferromagnetic material extending over said nozzle and defining a gap between said nozzle and said flapper;
    a link of ferromagnetic material completing a magnetic circuit between said flapper and said second end of said core;
    a feed line for a constant flow of feed air into said nozzle chamber and out through said nozzle into said gap;
    a body of electrically conducting non-ferromagnetic material surrounding said core in a region near said first end of said core, said body generating a core magnetic field in said core as a result generation of an induced current in said body due to alterations in current in said coil, said core magnetic field being oppositely directed to said coil magnetic field, said core magnetic field exerting a damping effect on movement of said flapper; and
    a pressure sensing line extending from said nozzle chamber to a pressure-dependent member for transmitting a pneumatic pressure signal from said nozzle chamber to said pressure-dependent member.

2. A signal converter as claimed in claim 1, and further comprising a spacing member of non-ferromagnetic material between said flapper and said core for preventing short-circuiting of said magnetic circuit between said core and said flapper.

3. A signal converter as claimed in claim 2, wherein said non-ferromagnetic material of said spacing member is a dielectric material.

4. A signal converter as claimed in claim 2, wherein said spacing member is provided on a side of said flapper adjacent to said nozzle.

5. An electro-pneumatic signal converter for converting an electrical current signal into a pneumatic pressure, said converter comprising:
    coil means for generating a coil magnetic field in said coil when an electrical current signal flows through said coil means;
    a magnetic circuit including core means of ferromagnetic material disposed in said coil means for generating a core magnetic field, said core means having a first end and a second end;
    nozzle chamber means in said core means for receiving a flow of feed air;
    nozzle exit means in said first end of said core means through which said feed air exits from said nozzle chamber means;
    flapper means of ferromagnetic material extending over said nozzle exit means and defining a gap between said nozzle exit means and said flapper means;
    link means of ferromagnetic material for completing a magnetic circuit between said flapper means and said second end of said core means;
    feed means for feeding a constant flow of feed air into said nozzle chamber means and out through said nozzle exit means into said gap;
    damping means for damping movement of said flapper means, said damping means including a body of electrically conducting non-ferromagnetic material surrounding said core means in a region near said first end of said core means, said body generating a core magnetic field in said core means as a result of generation of an induced current in said body due to alterations in current in said coil means, said core magnetic field being oppositely directed to said coil magnetic field, to thereby exert a damping effect on movement of said flapper means; and
    a pressure sensing means extending from said nozzle chamber means to a pressure-dependent member for transmitting a pneumatic pressure signal from said nozzle chamber means to said pressure-dependent member.

* * * * *